(12) United States Patent
McIntosh

(10) Patent No.: US 8,235,331 B2
(45) Date of Patent: Aug. 7, 2012

(54) DUCT SUPPORTING APPARATUS

(76) Inventor: David J. McIntosh, Ahwahnee, CA (US)

( * ) Notice: Subject to any disclaimer, the term of this patent is extended or adjusted under 35 U.S.C. 154(b) by 0 days.

(21) Appl. No.: 12/235,598

(22) Filed: Sep. 22, 2008

(65) Prior Publication Data

US 2009/0078832 A1 Mar. 26, 2009

Related U.S. Application Data

(60) Provisional application No. 60/974,517, filed on Sep. 24, 2007.

(51) Int. Cl.
*E21F 17/02* (2006.01)
(52) U.S. Cl. ............ 248/58; 248/75; 454/903; 138/107
(58) Field of Classification Search ............... 248/58, 248/60, 74.1, 74.3, 75, 79; 454/292, 903; 138/107

See application file for complete search history.

(56) References Cited

U.S. PATENT DOCUMENTS

| | | | |
|---|---|---|---|
| 3,165,286 A * | 1/1965 | Johnson et al. | 248/75 |
| 3,941,412 A * | 3/1976 | Carpenter | 294/74 |
| 5,005,789 A | 4/1991 | Jones | |
| 5,903,957 A * | 5/1999 | Le Manchec | 16/87.2 |
| 6,032,907 A * | 3/2000 | Santa Cruz et al. | 248/60 |
| 6,557,805 B1 | 5/2003 | Snyder | |
| 6,691,742 B1 | 2/2004 | Cooper | |
| 6,837,787 B2 * | 1/2005 | Crook | 454/292 |
| 6,959,898 B1 * | 11/2005 | Laughlin et al. | 248/60 |
| 7,083,151 B2 | 8/2006 | Rapp | |
| 7,740,211 B2 * | 6/2010 | Dukes | 248/74.4 |
| 7,914,047 B2 * | 3/2011 | Crook | 285/24 |
| 8,038,175 B2 * | 10/2011 | Crook | 285/24 |
| 2007/0114338 A1 * | 5/2007 | Boudreau et al. | 248/58 |

* cited by examiner

*Primary Examiner* — Bradley Duckworth
(74) *Attorney, Agent, or Firm* — Ash Tankha; Lipton, Weinberger & Husick

(57) ABSTRACT

Disclosed herein is an apparatus and method for supporting a flexible duct. The apparatus comprises a concave duct support structure with a convoluted anterior end and one or more straps. The concave duct support structure is placed in contact with outer surface of the flexible duct. The convoluted anterior end supports curved surfaces of the flexible duct. The concave duct support structure comprises multiple slits. The straps pass through the slits of the concave duct support structure. Distal ends of the straps may be affixed to a structural member for suspending the flexible duct supported on the concave duct support structure. The concave duct support structure prevents the flexible duct from sagging and crimping, thereby allowing free flow of air, liquids, etc. through the flexible duct.

8 Claims, 7 Drawing Sheets

DUCT SUPPORTING APPARATUS

CROSS REFERENCE TO RELATED APPLICATIONS

This application claims the benefit of provisional patent application No. 60/974,517 titled "Duct Saddle Strapping System", filed on Sep. 24, 2007 in the United States Patent and Trademark Office.

BACKGROUND

This invention, in general, relates to support devices. More particularly, this invention relates to an apparatus for supporting a flexible duct.

A duct is a tube or pipe used for conveying a liquid or a gas. Ducts are typically used in a heating, ventilating, and air conditioning (HVAC) system. Flexible ducts tolerate 3-dimensional movement and are lightweight. Flexible ducting is used in an HVAC system for transferring air flow in and out of a space. A suitable ducting system is needed for distributing warm and cold air in an enclosed space, for example, a room of a building. If the ducting system is not properly designed and installed, there are potential inefficiencies and energy wastage. Typically, metal strapping is used for supporting ducts to a rafter or a beam. Flexible ducting in residential and commercial applications for an HVAC system are typically secured to a beam or rafter by metal strapping using a hammer, a nail, or a screw gun during installation. The metal strapping is expensive and cumbersome to install because an installer has to hold the metal strapping in place with one hand while holding the nail with the same hand and at the same time swinging the hammer with the other hand provided there is enough room to swing the hammer.

The above installation procedure often does not adequately support the flexible duct due to the small contact area of the metal strapping with the flexible duct. Because of the difficulty of securing the strapping for supporting the flexible duct, most installers tend to stretch the spacing as far as possible in order to avoid repeating the difficult strapping procedure as few times as possible. As a result, due to the minimal contact area of the metal strapping that supports the duct and the distance between the metal strapping causes the duct to sag and crimp, which results in restricted airflow through the entire ducting system, affecting the overall efficiency of the HVAC system.

Hence, there is a need for a structure to support a flexible duct. Furthermore, there is a need for the structure to support curved surfaces of the flexible duct to avoid sagging and crimping and allow free flow of air, liquids, etc. through the flexible duct.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The apparatus and method disclosed herein addresses the above stated needs for an apparatus for supporting a flexible duct. The apparatus and method disclosed herein further supports curved surfaces of the flexible duct to avoid sagging and crimping, thereby allowing free flow of air, liquids, etc. through the flexible duct.

The apparatus disclosed herein comprises a concave duct support structure with a convoluted anterior end and one or more of multiple straps. The concave duct support structure is placed in contact with outer surface of the flexible duct. The convoluted anterior end supports curved surfaces of the flexible duct. The concave duct support structure may be made, for example, of a synthetic material. The concave duct support structure further comprises multiple slits. The straps pass through the slits of the concave duct support structure. The straps may be made, for example, of a synthetic material or a metallic material. Distal ends of the straps are affixed to a structural member for suspending the flexible duct supported on the concave duct support structure.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
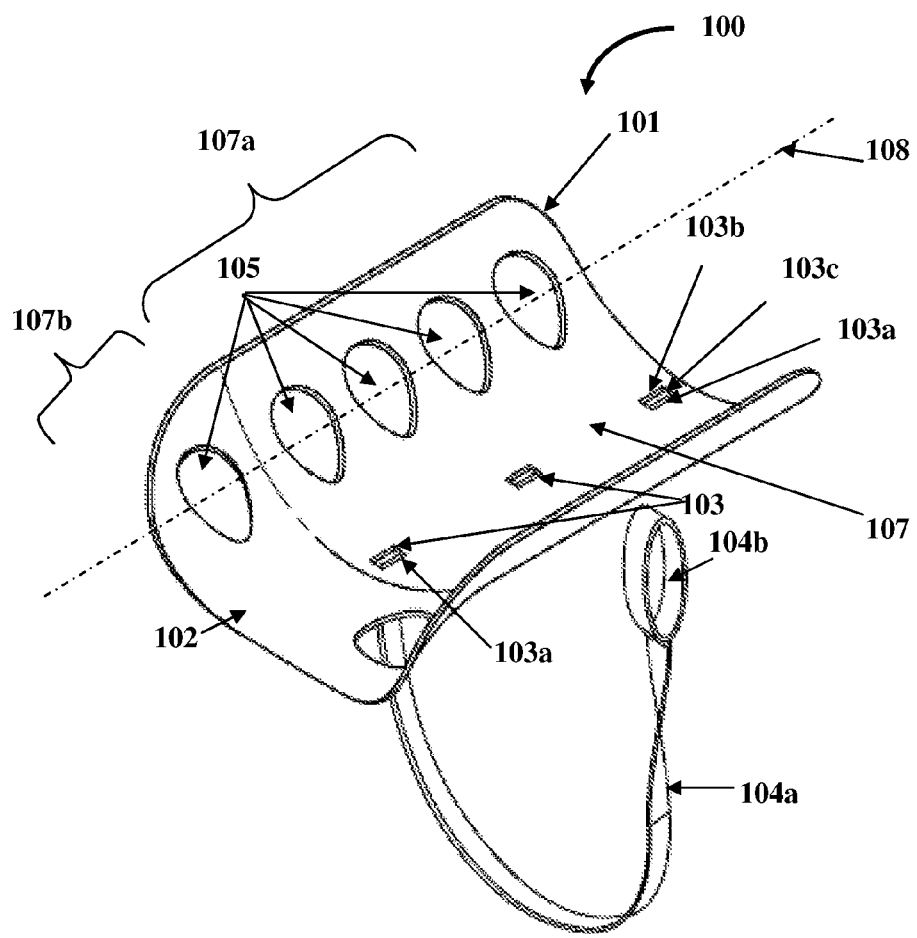
FIG. 1 illustrates an apparatus for supporting a flexible duct.

FIG. 1 illustrates an apparatus 100 for supporting a flexible duct 201. The apparatus 100 may, for example, support the flexible duct 201 in a heating, ventilating, and air conditioning (HVAC) system.

Figure 6:
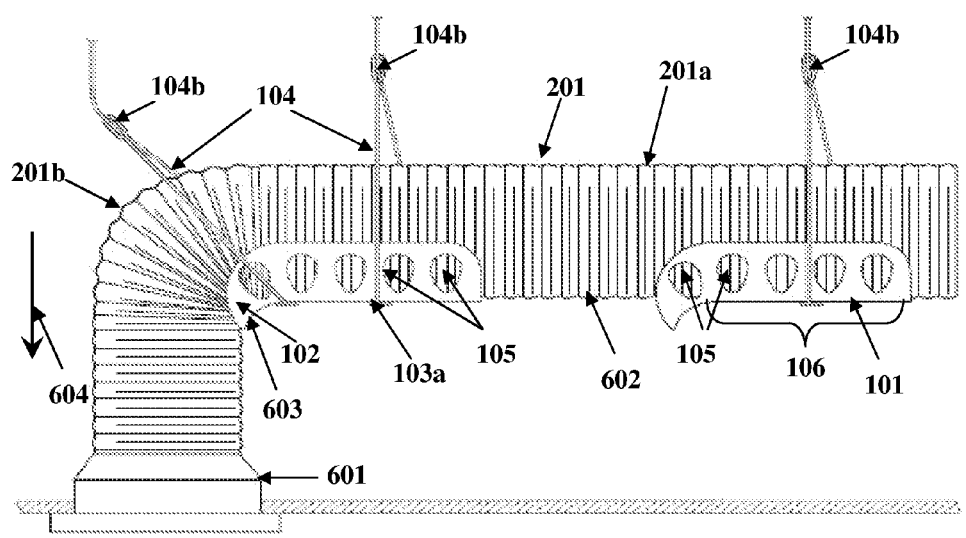
FIG. 6 exemplarily illustrates the flexible duct supported on two concave duct support structures suspended by multiple straps.

The apparatus 100 comprises a flexible duct 201 and a duct support 101 herein referred to as a "saddle". The saddle 101 is an arcuate duct support. The flexible duct 201 has a circular cross section. The flexible duct 201 defines a duct horizontal portion 201a and a duct curved portion 201b. The duct horizontal portion 201a is straight, and the duct curved portion 201b defines a 90 degree bend along a direction 604. As illustrated in FIG. 6, the flexible duct 201 has a duct bottom surface 602 that defines a duct bottom surface radius of curvature 603 in the direction 604 of the 90 degree bend. The duct support 101 has a longitudinal axis 108 and defines a duct supporting surface 107. The duct supporting surface 107 is arcuate and normal to the longitudinal axis 108. The duct supporting surface 107 defines a supporting surface horizontal portion 107a. The supporting surface horizontal portion 107a engages and supports the duct horizontal portion 201a of the duct 201. The duct supporting surface 107 further defines a supporting surface curved portion 107b. As shown in FIG. 6, the supporting surface curved portion 107b has a supporting surface radius of curvature 603 that is substantially the same as the duct bottom surface radius of curvature 603 in the direction 604 of the 90 degree bend. The supporting surface curved portion 107b engages the duct bottom surface 602 of the duct curved portion 201b at the 90 degree bend. The saddle 101 may be made of a lightweight synthetic material, for example, a plastic that is inexpensive and possesses the structural strength to support a flexible duct 201. The saddle 101 has a convoluted anterior end 102. The convoluted anterior end 102 of the saddle 101 supports curved surfaces of flexible duct 201. The convoluted anterior end 102 of the saddle 101 is an angular bend, for example, a 90.degree bend, that may be used for supporting a substantially right angle bends in the flexible duct 201 in the duct run. If several bends are required in a short space of the flexible duct 201, two saddles may be overlapped to form an inverted U shaped saddle. The apparatus 100 may therefore be used for supporting flexible ducts that are straight, or that bend, or are curved. If several bends are required, several saddles are overlapped to provide the necessary support for the flexible duct 201. The saddle 101 may therefore be used for supporting straight horizontal portions and substantially right angle bends simultaneously or interchangeably.

Openings 105 are optionally provided in the saddle 101 for reducing the amount of synthetic material, for example, plastic, used for the manufacture of the saddle 101. The openings 105 may be of any shape and size provided the openings 105 do not affect the structural strength and rigidity of the saddle 101 for the saddle's 101 intended function, namely, providing support for the flexible duct 201.

The saddle 101 prevents the flexible duct 201 from sagging and crimping, thereby allowing free flow of air, liquids, etc. through the flexible duct 201. The saddle 101 is a rigid support designed to allow proper airflow through the HVAC system. The saddle 101 is placed in contact with outer surface of the flexible duct 201. The saddle 101 provides more surface contact area with the outer surface of the flexible duct 201, thereby providing the necessary support to the flexible duct 201.

Figure 2:
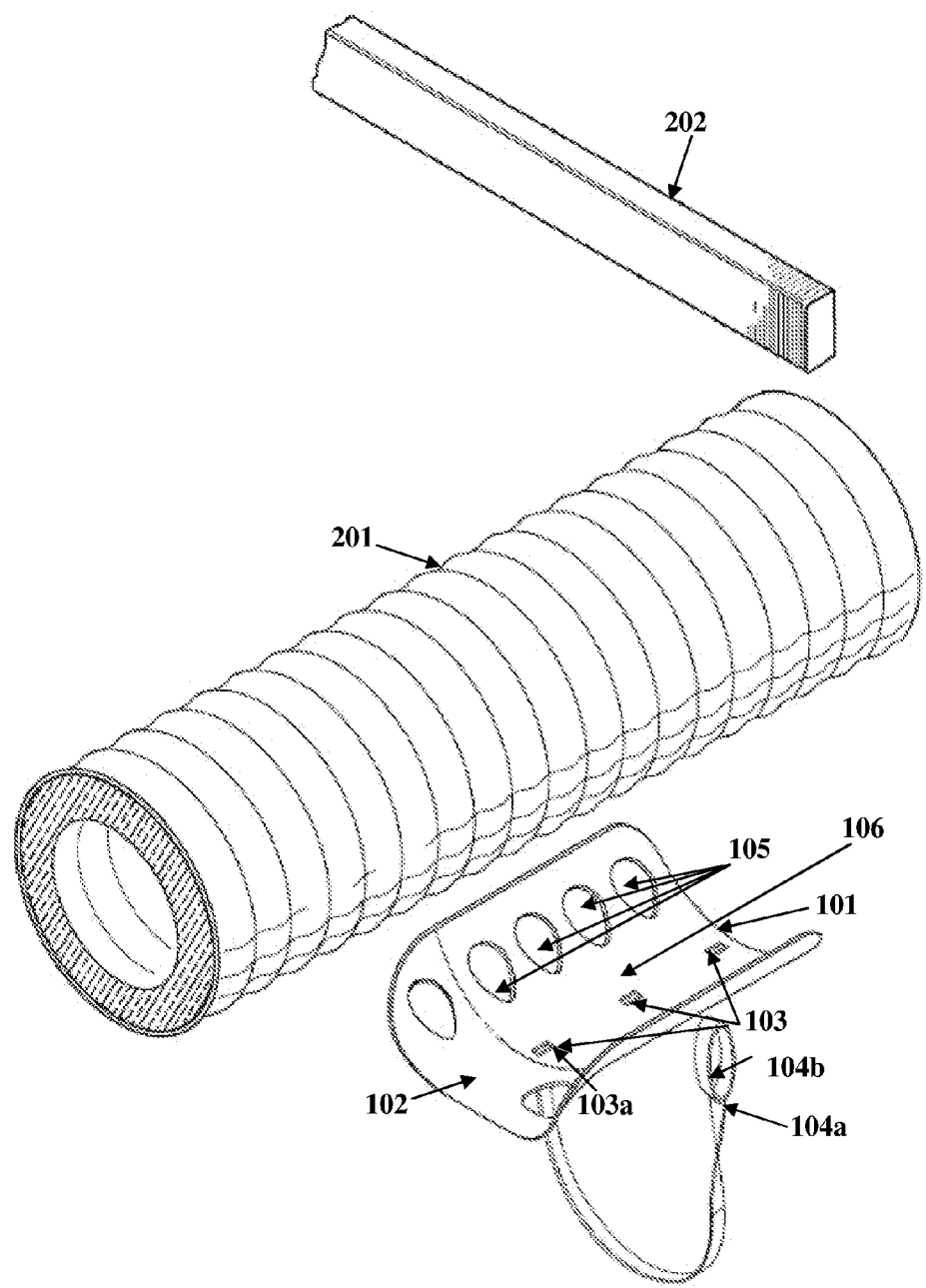
FIG. 2 exemplarily illustrates a side view of the apparatus, the flexible duct, and a structural member.
Figure 3:
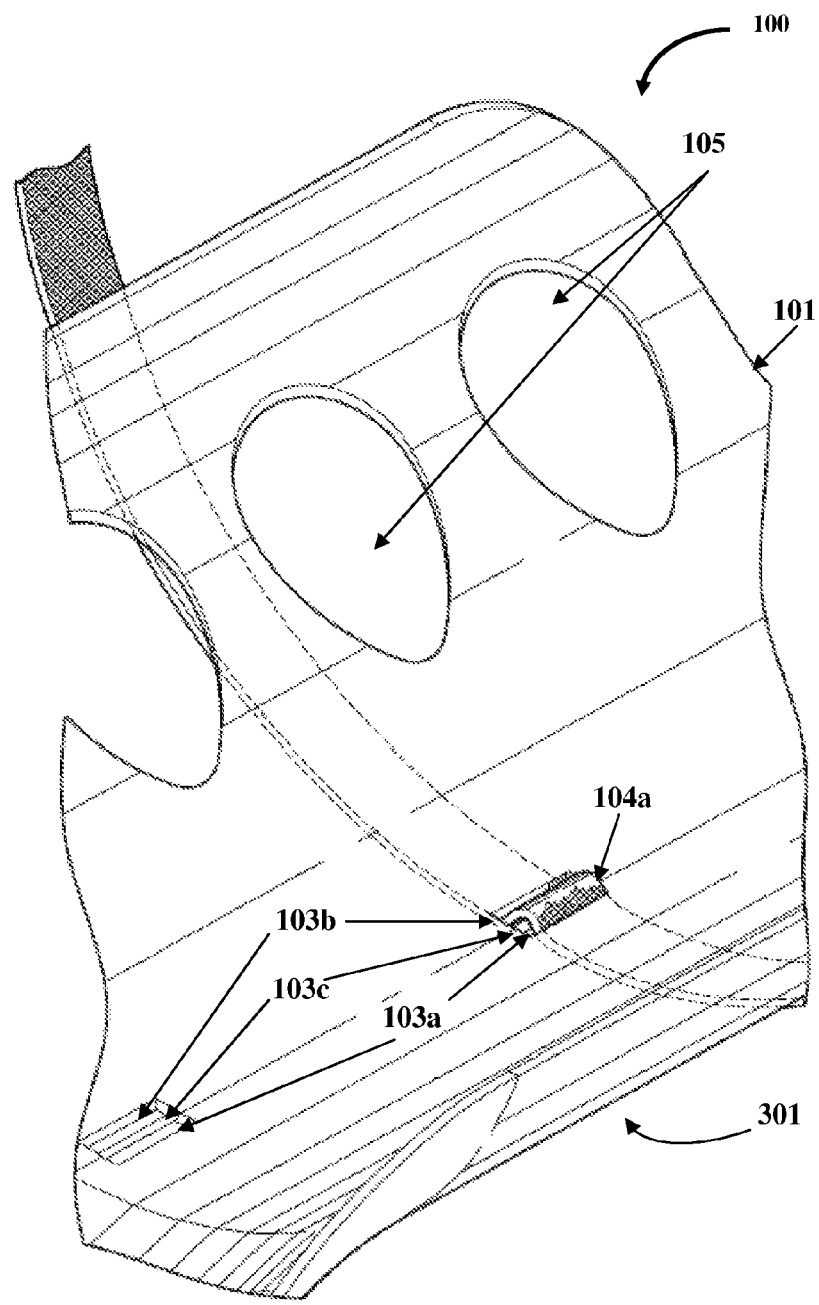
FIG. 3 exemplarily illustrates a concave duct support structure with a single strap passing through a single slit of the concave duct support structure.

The saddle 101 further defines a first slot 103a and a second slot 103b communicating through the duct supporting surface 107, as illustrated in FIG. 1. The saddle 101 further comprises one or more of multiple straps 104. The straps 104 may be made, for example, of a synthetic material or a metallic material. For example, the straps 104 may be made of plastic, wire, vinyl, metal, etc. The straps 104 may also be made of a flexible plastic. The saddle 101 does not require an adhesive to remain in contact with the outer surface of the flexible duct 201. The first slot 103a and the second slot 103b define a bar 103c between the first slot 103a and the second slot 103b. As shown in FIG. 3, the lower surface 301 of the saddle is supported by strap 104 which is inserted through the first slot 103a, positioned over the bar 103c and inserted through and out of the second slot 103b to prevent disengagement of the strap 104 from the duct support 101. The straps 104 pass through and slidably engage the first slot 103a and the second slot 103b of the saddle 101, and are positioned below and in contact with the lower surface 301 of the saddle 101 to support the saddle 101 suspended from the overhead structural member 202. Distal ends of the straps 104 are affixed to a structural member 202. A side view of the apparatus 100, the flexible duct 201, and a structural member 202 is exemplarily illustrated in FIG. 2. A single strap 104a passing through the first slot 103a and the second slot 103b is exemplarily illustrated in FIGS. 1-5. Two straps 104 supporting the saddle 101 is exemplarily illustrated in FIG. 6.

Figure 4:
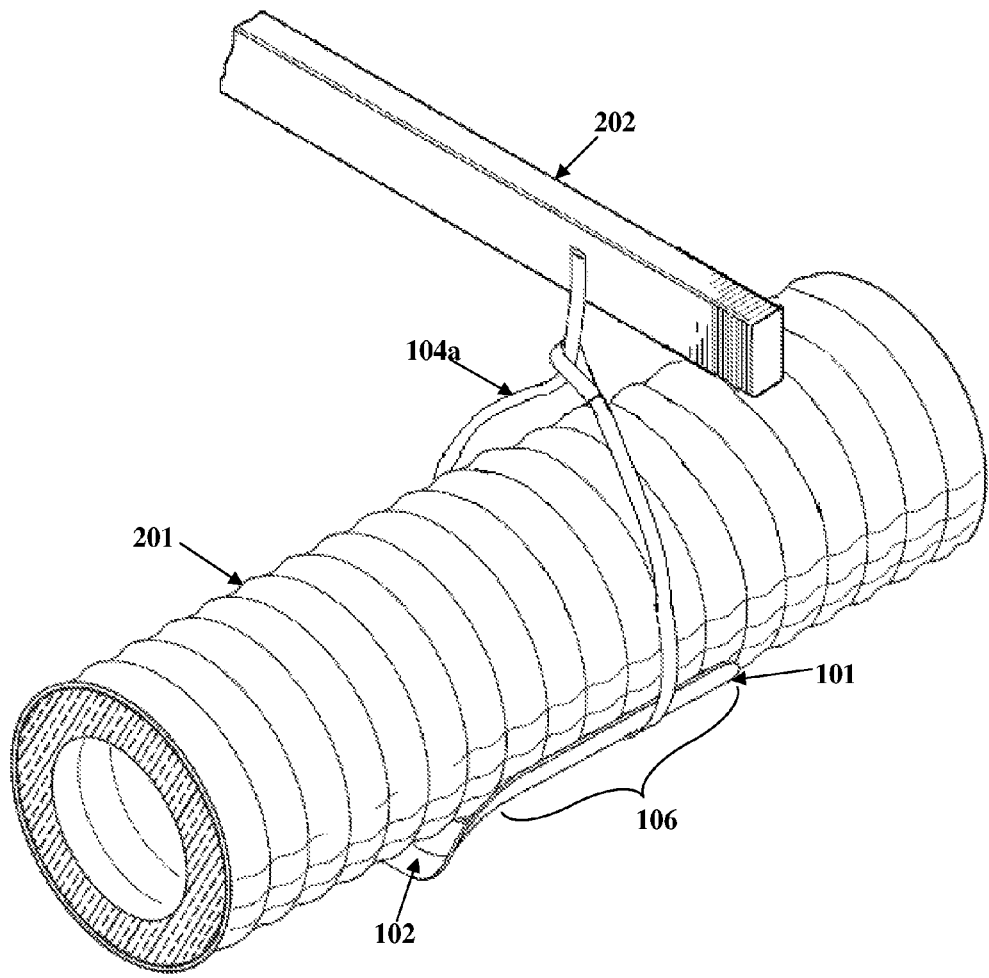
FIG. 4 exemplarily illustrates suspension of a flexible duct supported on the concave duct support structure using a single strap affixed to the structural member.
Figure 5:
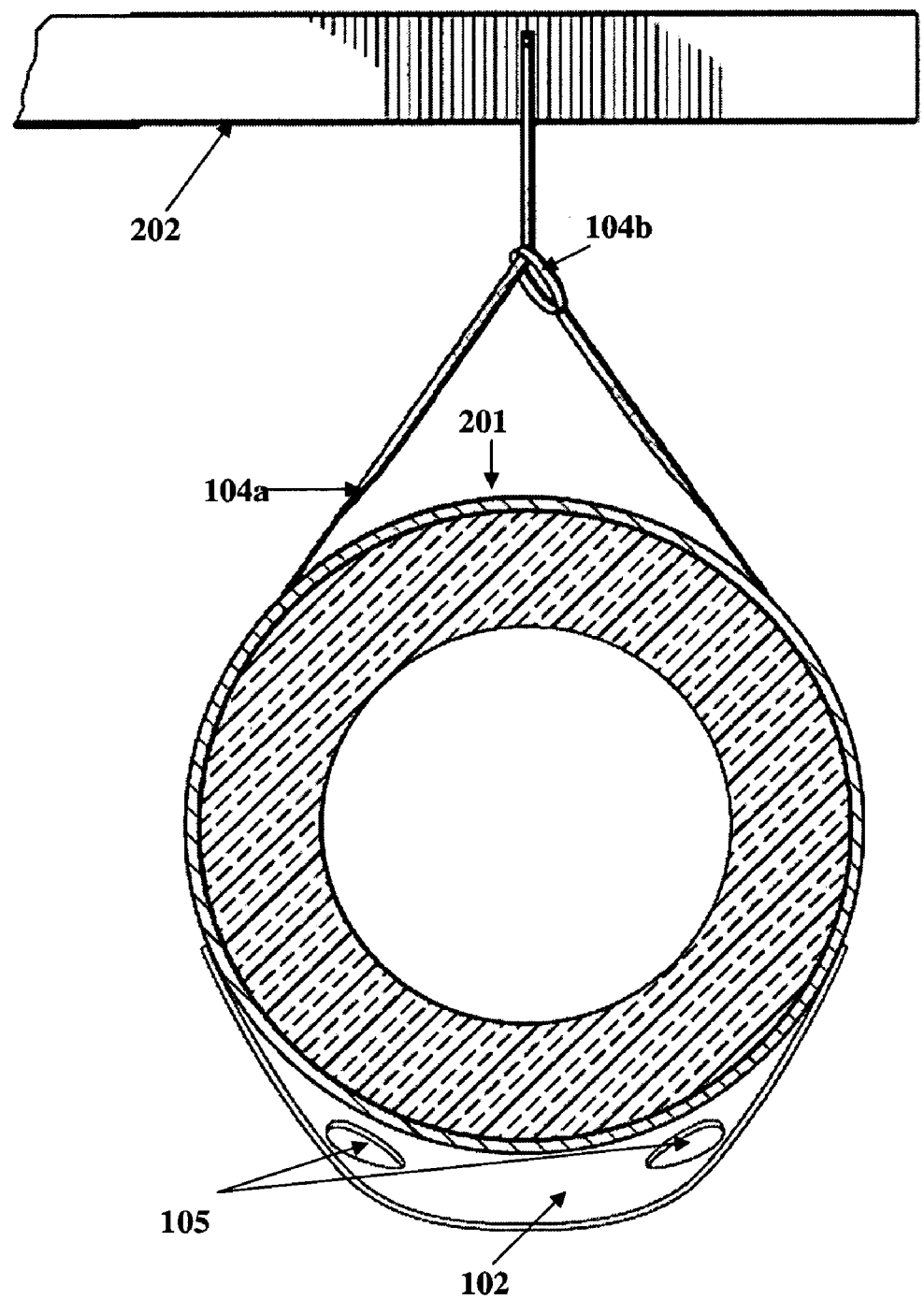
FIG. 5 exemplarily illustrates a front sectional view of the flexible duct supported on the concave duct support structure suspended by a single strap affixed to the structural member.

The saddle 101 may use a single strap 104a for suspending the flexible duct 201 from the structural member 202. FIG. 3 exemplarily illustrates the saddle 101 with a single strap 104a passing through the slots 103a and 103b of the saddle 101. Multiple straps 104 may also be used to suspend the flexible duct 201 where the flexible duct 201 bends into a supply boot 601 as exemplarily illustrated in FIG. 6. A second strap may be used at apex of the bend to provide resistance to keep the flexible duct 201 from springing backward and sagging. Distal ends of the straps 104 are affixed to a structural member 202 for suspending the flexible duct 201 supported on the saddle 101. The structural member 202 may, for example, be a rafter, a beam, etc. The distal ends of the straps 104 are affixed to the structural member 202 using devices that make the installation process easier and faster. For example, a stapler may be used for affixing the distal ends of the straps 104 to the structural member 202. The distal ends of the straps 104 may be affixed to the structural member 202 by affixing both distal ends of the straps 104 to the structural member 202. Alternatively, one distal end of each of the straps 104 may be inserted through a loop 104b of the other distal end and affixed to the structural member 202 as illustrated in FIG. 4 and FIG. 5.

The saddle 101 may be made of a plastic, for example, polypropylene. Polypropylene is inexpensive, safe to work with, and easier and faster to install the apparatus 100 with a stapler. The flexible duct 201 supported on the saddle 101 is suspended by a single strap 104a affixed to the structural member 202 as exemplarily illustrated in FIG. 4. A front sectional view of the flexible duct 201 supported on the saddle 101 suspended by a single strap 104a affixed to the structural member 202 is exemplarily illustrated in FIG. 5. The apparatus 100 supports the flexible duct 201 and enables free flow of fluids through the flexible duct 201. The apparatus 100 also reduces installation time of the ducting.

Figure 7:
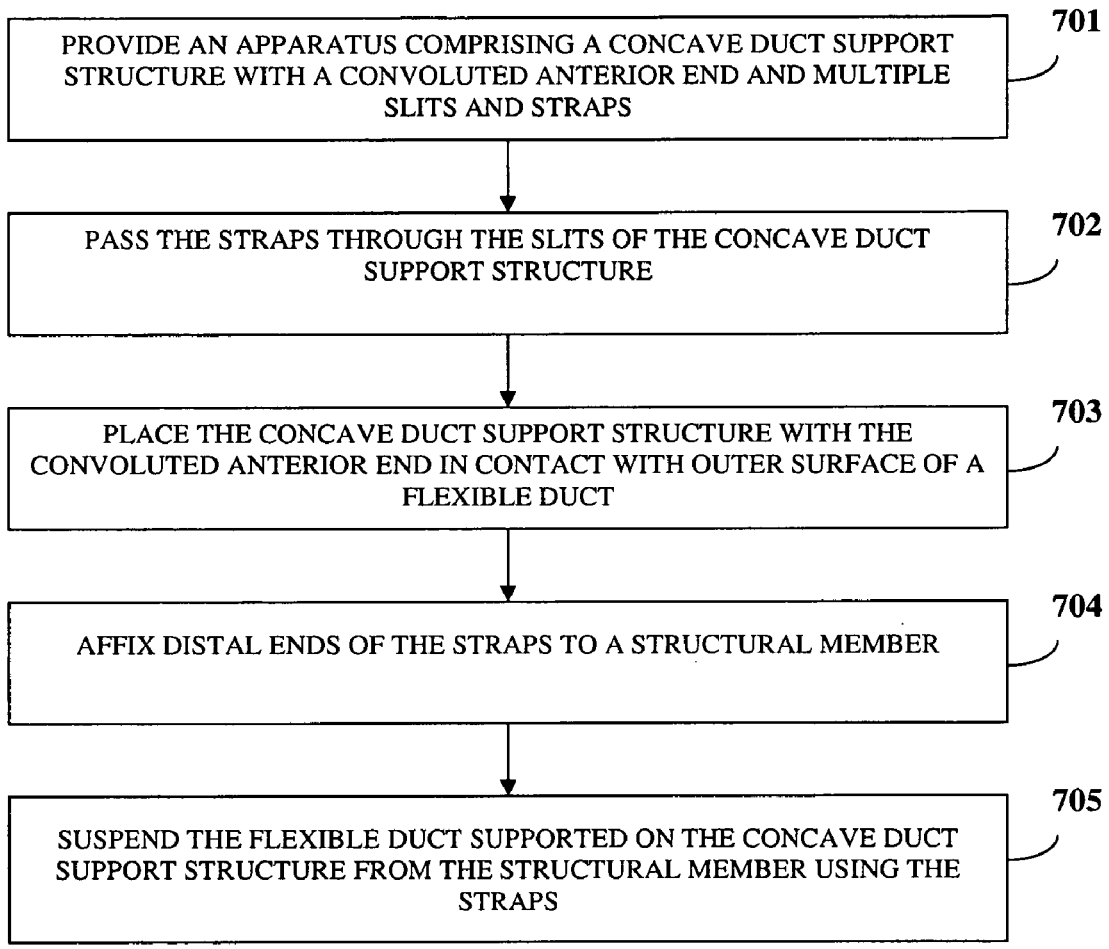
FIG. 7 illustrates a method of supporting a flexible duct.

FIG. 7 illustrates a method of supporting a flexible duct. An apparatus is provided 701 for supporting the flexible duct. The apparatus comprises a saddle and one or more straps. The saddle has a convoluted anterior end and multiple slits. One or more straps are passed 702 through the slits of the saddle. The saddle with the convoluted anterior end is placed 703 in contact with outer surface of the flexible duct. The convoluted anterior end supports bends in the flexible duct. Distal ends of the straps are affixed 704 to a structural member. The distal ends are affixed to the structural member using a device, for example, a stapler. The distal ends of the strap may be affixed to the structural member by affixing both distal ends of the straps to the structural member. Alternatively, one distal end of each of the straps may be inserted through a loop of the other distal end and affixed to the structural member as illustrated in FIG. 4 and FIG. 5. The flexible duct supported on the saddle is suspended 705 from the structural member using the straps. The apparatus thereby supports the flexible duct. The apparatus also enables an easy and fast installation process by an installer.

Consider an example where an installer needs to provide support for a flexible duct 201 in the ducting of an HVAC system. The installer measures and cuts a single strap 104a to an appropriate length using, for example, a pair of scissors. The installer passes the strap 104a through the slots 103a and 103b on the saddle 101. The installer places the saddle 101 with the convoluted anterior end 102 in contact with the outer surface of a flexible duct 201. The installer then staples the distal ends of the strap 104a to a rafter using, for example, a stapler. The strap 104a suspends the flexible duct 201 supported on the saddle 101 from the rafter. The installer therefore with the aid of the apparatus 100 supports the flexible duct 201 used in the ducting of the HVAC system.

The apparatus 100 may further use metal strapping or wire instead of lightweight plastic straps when required. The apparatus 100 may be of different sizes for accommodating different sizes of flexible ducts. The apparatus 100 is designed to fit different configurations and applications.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects

I claim:

1. An apparatus, said apparatus comprising:
   a. a flexible duct, said flexible duct being circular in cross section, said flexible duct defining a duct horizontal portion and a duct curved portion, said duct horizontal portion being straight, said duct curved portion defining a substantially 90 degree bend, said substantially 90 degree bend defining a direction, said duct having a duct bottom surface, said duct bottom surface defining a duct bottom surface radius of curvature in said direction of said substantially 90 degree bend;
   b. a duct support, said duct support having a longitudinal axis and defining a duct supporting surface, said duct supporting surface being arcuate and normal to said longitudinal axis, said duct supporting surface defining a supporting surface horizontal portion, said supporting surface horizontal portion engaging and supporting said duct horizontal portion;
   c. said duct supporting surface defining a supporting surface curved portion, said supporting surface curved portion having a supporting surface radius of curvature equal to said duct bottom surface radius of curvature in said direction of said substantially 90 degree bend, said supporting surface curved portion engaging said duct bottom surface of said duct curved portion at said substantially 90 degree bend;
   d. said duct support defining a first slot and a second slot communicating through said duct supporting surface, said first slot and said second slot defining a bar between said first and second slots, each of said slots being configured to receive a strap, said strap communicating through said first slot and said second slot, said bar being configured to prevent disengagement of said strap from said duct support, said strap having a first distal end and a second distal end, said first distal end and said second distal end being secured to a structural member.

2. The apparatus of claim 1, wherein supporting the duct at said substantially 90 degree bend applies an axial load on the duct and hence on the duct support.

3. The apparatus of claim 1, wherein the duct support is made of a synthetic material.

4. The apparatus of claim 1, wherein the strap is made of one of a synthetic material and a metallic material.

5. The apparatus of claim 1, wherein the duct support structure prevents the flexible duct from sagging and crimping, thereby allowing said free flow of air and liquids through the flexible duct.

6. A method of supporting a flexible duct, comprising the steps of:
   providing an apparatus, said apparatus comprising:
   a. said flexible duct, said flexible duct being circular in cross section, said duct defining a duct horizontal portion and a duct curved portion, said duct horizontal portion being straight, said duct curved portion defining a substantially 90 degree bend, said substantially 90 degree bend defining a direction, said duct having a duct bottom surface, said duct bottom surface defining a duct bottom surface radius of curvature in said direction of said substantially 90 degree bend;
   b. a duct support, said duct support having a longitudinal axis and defining a duct supporting surface, said duct supporting surface being arcuate and normal to said longitudinal axis, said duct supporting surface defining a supporting surface horizontal portion, said supporting surface horizontal portion engaging and supporting said duct horizontal portion;
   c. said duct supporting surface defining a supporting surface curved portion, said supporting surface curved portion having a supporting surface radius of curvature equal to said duct bottom surface radius of curvature in said direction of said substantially 90 degree bend, said supporting surface curved portion engaging said duct bottom surface of said duct curved portion at said substantially 90 degree bend;
   d. said duct support defining a first slot and a second slot communicating through said duct supporting surface, said first slot and said second slot defining a bar between said first and second slots, each of said slots being configured to receive a strap, said strap communicating through said first slot and said second slot, said bar being configured to prevent disengagement of said strap from said duct support, said strap having a first distal end and a second distal end, said first and said second distal ends capable of being secured to a structural member
   passing said strap through each of said slots of the duct support, wherein the strap passes under the duct support for supporting the duct support for suspension;
   placing the flexible duct in contact with said duct supporting surface;
   affixing said first distal end and said second distal end of the strap to said structural member for suspending the flexible duct supported on said duct support.

7. The method of claim 6, wherein said step of affixing is performed by affixing both the first distal end and the second distal end of the strap to the structural member.

8. The method of claim 6, wherein said step of affixing is performed by inserting one of the first distal end and the second distal end of the strap through a loop of the other of the first distal end and the second distal end and affixing said other of the first distal end and the second distal end to the structural member.

* * * * *